(12) United States Patent
Cai

(10) Patent No.: US 8,145,514 B2
(45) Date of Patent: Mar. 27, 2012

(54) CHARGING ELEMENT CAPACITY CONTROL IN AN IMS NETWORK

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1167 days.

(21) Appl. No.: 11/807,802

(22) Filed: May 30, 2007

(65) Prior Publication Data

US 2008/0299944 A1 Dec. 4, 2008

(51) Int. Cl.
*G06Q 10/00* (2012.01)

(52) U.S. Cl. .......................................... 705/7.11; 705/32

(58) Field of Classification Search .................. 705/1.1, 705/7, 26, 28, 29, 30, 400, 7.11, 7.12, 7.13, 705/7.15, 7.22, 7.23, 32; 370/395.51, 395.52, 352, 401, 468

See application file for complete search history.

(56) References Cited

U.S. PATENT DOCUMENTS

| 5,530,744 | A | * | 6/1996 | Charalambous et al. | 379/266.08 |
| 6,061,332 | A | * | 5/2000 | Branton et al. | 370/241 |
| 7,236,483 | B2 | * | 6/2007 | Yeom | 370/352 |
| 2006/0291477 | A1 | * | 12/2006 | Croak et al. | 370/395.51 |
| 2008/0162246 | A1 | * | 7/2008 | Chen-Ritzo et al. | 705/9 |

* cited by examiner

*Primary Examiner* — Igor Borissov
(74) *Attorney, Agent, or Firm* — Hitt Gaines, PC

(57) ABSTRACT

Systems and methods are disclosed that allow an equipment vendor to monitor and detect overloads of IMS charging element equipment (e.g., the CCF or CDF) relative to certain vendor-specified thresholds and, responsive to detecting overloads, vendors may take action to exercise capacity control and/or collect revenue for the overload conditions.

13 Claims, 4 Drawing Sheets

CHARGING ELEMENT CAPACITY CONTROL IN AN IMS NETWORK

BACKGROUND OF THE INVENTION

1. Field of the Invention

The invention is related to the field of communications and, in particular, to systems and methods for charging element capacity control in IMS networks.

2. Statement of the Problem

One type of communication network gaining popularity is an IP Multimedia Subsystem (IMS) network. As set forth in the 3$^{rd}$ Generation Partnership Project (3GPP), IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS charging elements. These standards can reduce the network integration costs and let the subscriber enjoy more stable services.

Examples of IMS charging elements include a Charging Collection Function (CCF) as defined by the 3GPP Release 5 or a combination of Charging Data Function (CDF) and Charging Gateway Function (CGF) as defined by the 3GPP Release 6. A CCF or a CDF receives call measurement data and charging information from a plurality of network nodes serving an IMS call, then generates Charging Data Records (CDR) and transmits the CDRs to a billing system. The CCF or CDF also processes the call measurement data and charging information to derive network traffic and performance information which is forwarded to a network management system operated by the service provider. In such manner, the service provider can monitor the traffic flows and system performance associated with the charging elements.

The charging elements are typically engineered to accommodate traffic flows not exceeding a stated (or "engineered") capacity; and the service provider will generally provision/purchase charging equipment based on the engineered capacity to accommodate expected network traffic. (For this reason, the term "purchased capacity" is often used synonymously with the stated or engineered capacity.) The service provider can configure alarms to be generated to the network management system when the traffic flows approach or exceed the purchased capacity. Responsive to such alarms, the service provider at its discretion may reduce traffic or shut down the charging elements to prevent overload of the charging elements and to maintain system performance. However, it is also within the service provider's discretion to push the charging equipment beyond its purchased capacity and/or to configure no or low level alarms to the network management system when approaching or exceeding the purchased capacity. If this occurs, there is presently no mechanism for the equipment vendor/seller to control, monitor or collect revenue for the overload on charging elements relative to the purchased capacity.

SUMMARY OF THE SOLUTION

This invention solves the above and other problems by providing a mechanism for an IMS charging element equipment vendor/seller to receive network traffic and performance information associated with the charging elements so as to exercise capacity control of charging elements in an IMS network. Advantageously, the information provided to the equipment vendor may differ from and may be provided independently of information provided to the service provider via the network management system. Under such mechanism, vendors may monitor and detect overloads on the charging elements (e.g., the CCF or CDF) relative to purchased capacity. Responsive to detecting overloads, vendors may exercise control and/or collect revenue for the overload condition.

In one embodiment of the invention, an IMS network adapted to provide charging element capacity control comprises a plurality of network nodes adapted to generate charging information including call measurement data associated with one or more calls. A charging system receives and process the charging information from the network nodes to derive charging element loading information. The charging system is operable to report at least a portion of the charging element loading information to a charging element equipment vendor.

Another embodiment of the invention is a method of operating an IMS charging system to provide vendor capacity control of IMS charging elements. The method comprises receiving charging information including call measurement data associated with one or more IMS calls, processing the charging information to derive charging element loading information, comparing the loading information to one or more equipment loading thresholds specified by a charging element equipment vendor, defining vendor thresholds; and generating alerts/reports to the equipment vendor upon occurrence of specified overloads relative to the vendor thresholds.

Yet another embodiment of the invention is a method of implementing shared revenue collection in an IMS charging system for specified overloads relative to purchased capacity. The method comprises collecting revenues associated with the charging element and monitoring loading of the charging element relative to the purchased capacity. For so long as the loading does not exceed the purchased capacity, the revenue is allocated to a service provider operating the charging element. However, for instances of loading that exceed the purchased capacity, at least a portion of the revenue is allocated to an equipment vendor associated with the charging element.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
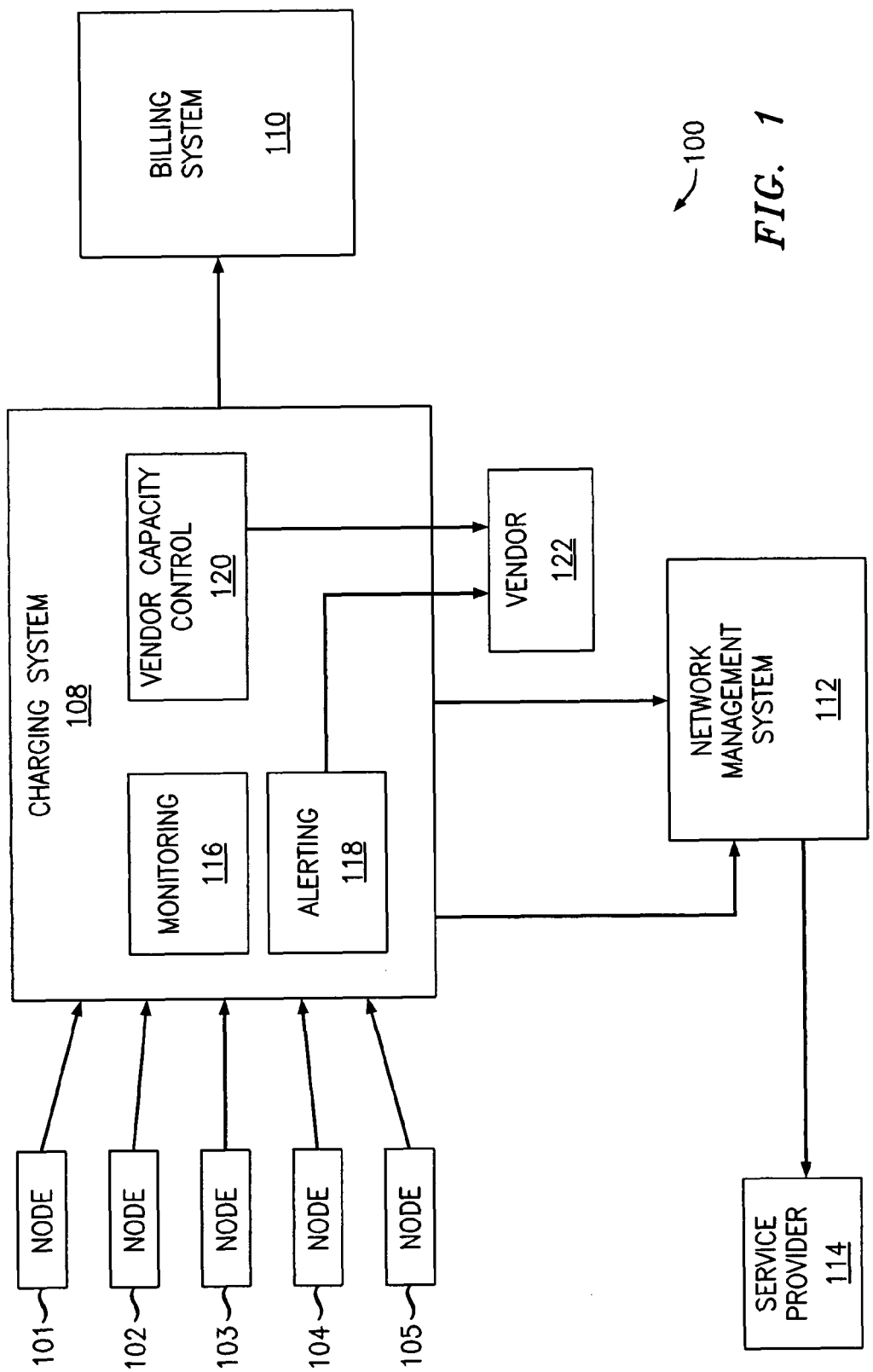
FIG. 1 illustrates an IMS network in an exemplary embodiment of the invention operable to provide vendor capacity control of IMS charging elements.

FIG. 1 illustrates an IMS network 100 in an exemplary embodiment of the invention. The IMS network 100 includes a plurality of network nodes 101-105, a charging system 108, a billing system 110 and a network management system 112. The network nodes 101-105 comprise any elements, systems, or servers in the IMS network 100 adapted to serve a call. Examples of network nodes 101-105 include a serving-Call Session Control Function (S-CSCF), a proxy-CSCF (P-CSCF), an interrogate-CSCF (I-CSCF), a Multimedia Resource Function Controller (MRFC), an application server (AS), a Media Gateway Control Function (MGCF), a Breakout Gateway Control Function (BGCF), etc. The network management system 112 comprises any system or server adapted to control, plan, allocate, deploy, coordinate, and/or monitor the resources of IMS network 100. The IMS network 100 may include other networks, systems, or devices not shown in FIG. 1.

The charging system 108 comprises any element, system, or server adapted to interface network nodes 101-105 with a billing system 110 and network management system 112. The network nodes 101-105 serve IMS calls in some manner, generate call measurement data and charging information and provide such information to the charging system 108. The charging system 108 represents a centralized charging system that collects and processes the call measurement data and charging information to generate and transmit CDRs for the billing system 110 and to derive network traffic and performance information for the network management system 112 (and hence to the service provider 114).

According to features and aspects herein, the charging system 108 is further operable to monitor network traffic and performance information and generate reports/alarms to the charging element vendor 122 (e.g., via a log file or via separate message) to allow the vendor to exercise capacity control of specified charging system elements (e.g., the CCF or CDF). Advantageously, the information provided to the equipment vendor 122 may differ from and may be provided independently of information provided to the service provider 114 via the network management system 112. To that end, the charging system 108 includes a monitoring element 116, an alerting element 118 and a vendor capacity control element 120. The monitoring element 116 monitors network traffic served by the charging elements relative to the purchased capacity; the alerting element 118 generates alerts to the vendor 122 upon reaching certain capacity thresholds (advantageously specified by the vendor); and the vendor capacity control element 120 allows for the vendor 122 to exercise control, for example, to shut down or restrict operation of the charging elements and/or to implement a shared revenue collection feature responsive to charging element overloads.

Figure 2:
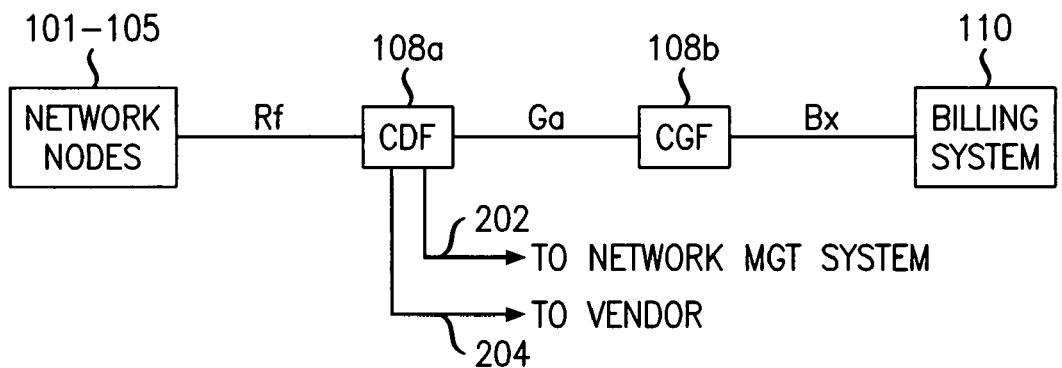
FIG. 2 illustrates a first exemplary configuration of IMS charging elements.
Figure 3:
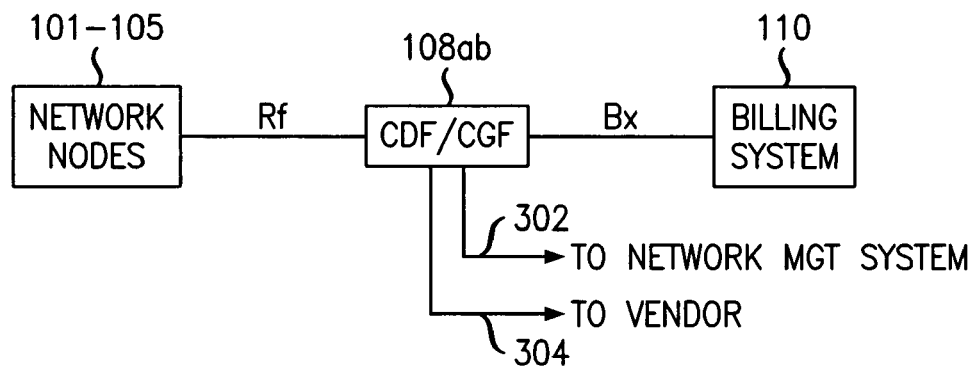
FIG. 3 illustrates a second exemplary configuration of IMS charging elements.
Figure 4:
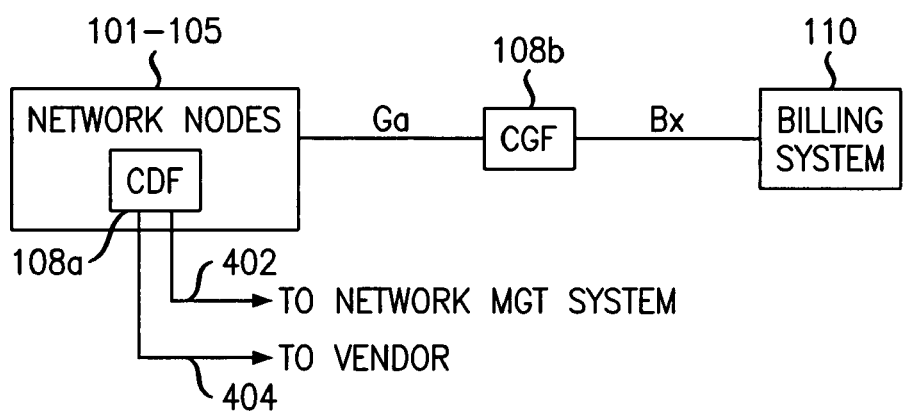
FIG. 4 illustrates a third exemplary configuration of IMS charging elements.

FIG. 2, FIG. 3 and FIG. 4 illustrate three exemplary configurations of IMS charging elements that may be implemented in the IMS network 100. Each configuration includes a Charging Data Function (CDF) and Charging Gateway Function (CGF) as defined by the 3GPP Release 6. Generally, in each configuration, the CDF and CGF serve as an interface between network nodes 101-105 and a billing system 110. The CDF operates to receive and process call measurement data and charging information from the network nodes 101-105 and generate and deliver CDRs to the billing system 110 via the CGF. The CDF also operates to derive network traffic and performance information from the call measurement data and charging information and to provide reports and alarms to the network management system 112 (and hence the service provider 114) and the vendor 122. Advantageously, as has been noted, the reports and alarms provided to the network management system 112 may differ from and may be provided independently of reports and alarms provided to the vendor 122.

In FIG. 2, the CDF and CGF reside in two separate physical elements 108a, 108b. The CDF 108a receives call measurement data and charging information from network nodes 101-105 over a Diameter Rf interface. The CDF 108a processes the charging information to generate CDRs, and transmits the CDRs via a Diameter Ga interface to the CGF 108b. The CGF 108b transmits the CDRs to a billing system 110 via Diameter Bx interface. Further, the CDF 108a processes the charging information to derive network traffic and performance data. The CDF 108a sends reports/alarms associated with the network traffic and performance data via separate messages 202, 204 to the network management system 112 and to the vendor 122.

In FIG. 3, the CDF and CGF coexist in the same physical platform 108ab. The CDF/CGF 108ab receives call measurement data and charging information from network nodes 101-105 over a Diameter Rf interface. The CDF/CGF 108ab processes the charging information to generate CDRs and transmits the CDRs via a Diameter Bx interface to the billing system 110. Since the CDF 108a is integrated with the CGF, CDRs are communicated from the CDF to CGF portions via internal API rather than over a Diameter Ga interface. Further, the CDF/CGF 108ab processes the charging information to derive network traffic and performance data. The CDF/CGF 108ab sends reports/alarms associated with the network traffic and performance data via separate messages 302, 304 to the network management system 112 and to the vendor 122.

In FIG. 4, the CDF and CGF comprise two separate physical elements 108a, 108b, substantially as in FIG. 2 except the CDF 108a is integrated within the network nodes 101-105. Since the CDF 108a is integrated with the network nodes, it receives call measurement data and charging information via internal API rather than over a Diameter Rf interface. The CDF 108a processes the charging information to generate CDRs, and transmits the CDRs via a Diameter Ga interface to the CGF 108b. The CGF 108b transmits the CDRs to a billing system 110 via Diameter Bx interface. Further, the CDF 108a processes the charging information to derive network traffic and performance data. The CDF 108a sends reports/alarms associated with the network traffic and performance data via separate messages 402, 404 to the network management system 112 and to the vendor 122.

Figure 5:
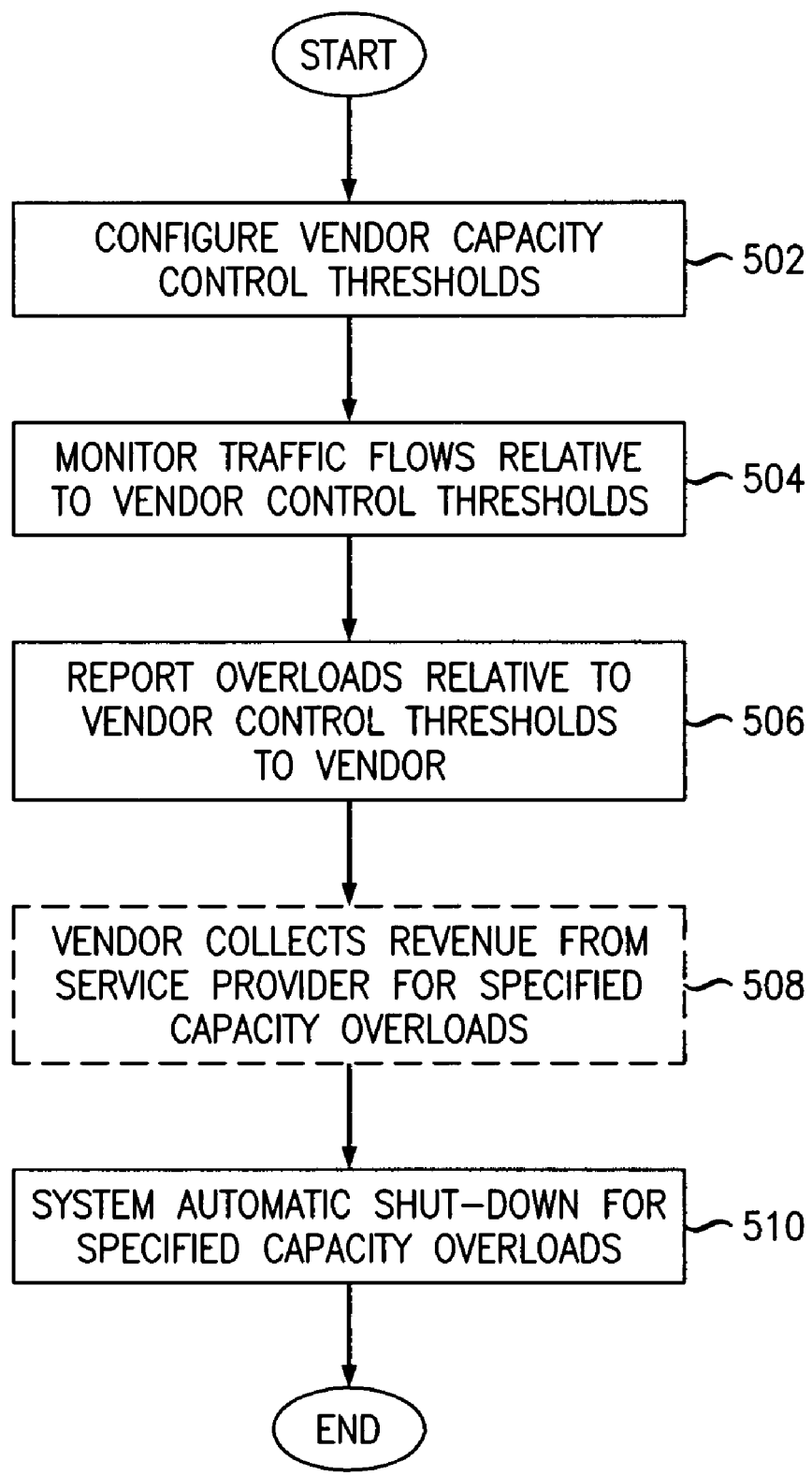
FIG. 5 is a flow chart illustrating a method of operating an IMS network to provide vendor capacity control of charging elements in an exemplary embodiment of the invention.

Now turning to FIG. 5, there is shown a flow chart illustrating a method of operating an IMS network to provide vendor capacity control of charging elements according to an exemplary embodiment of the invention. The steps of FIG. 5 will be described with reference to IMS network 100 in FIG. 1. In one embodiment, the steps of FIG. 5 are implemented in software or firmware residing in the monitoring element 116, alerting element 118 and/or vendor capacity control element 120 of the charging system 108 shown in FIG. 1. The charging system 108 may be implemented, without limitation, in physical structures configured as shown in FIG. 2, FIG. 3 or FIG. 4. The steps of the flow chart in FIG. 5 are not all inclusive and may include other steps not shown.

At step 502, the IMS charging equipment vendor configures capacity control thresholds associated with specified elements of the charging system 108 (e.g., the CDF) to trigger certain actions, generate reports, alarms, or the like when the thresholds are reached. Advantageously, step 502 is performed independently by the equipment vendor (i.e., independent of the service provider), for example, before shipping the equipment to the service provider or alternatively, the vendor may update the settings post-sale if the service provider agrees. The actions, reports, alarms or the like that are to be triggered from the thresholds configured at step 502 may differ from and may be provided independently of actions, reports, alarms or the like provided to the service provider via the network management system 112. As an example, presuming the vendor desires to monitor and detect overloads on the CDF relative to purchased capacity, the vendor may specify the following thresholds/actions relative to purchased capacity: 100% capacity (i.e., nominal overload)—start metering of overload traffic; 110% capacity (10% overload)—start shared revenue collection; and 150% capacity (50% overload)—system automatic shut down. As will be appreciated, any of these thresholds may trigger different alarms, reports or the like to be delivered to the vendor 122.

Optionally, the vendor capacity control thresholds can be dynamically adjusted based on network characteristics or conditions, external conditions or the like. For example, the vendor capacity control thresholds may be varied or adjusted based on conditions including, without limitation, different roles, functions or configurations of the charging elements (e.g., CDF, CGF, integrated CDF/CGF, integrated network nodes/CDF, etc.), served network type (e.g., IMS only or IMS linked to packet network), geographic location, different comparative thresholds (i.e., thresholds can be set relative to something other than purchased capacity), time of day, day of week, holiday (e.g., holiday traffic may be allowed to exceed normal overload thresholds without overcharge).

At step 504, the charging system 108 (in particular, the monitoring element 116) monitors traffic flows served by the charging system 108 relative to the vendor control thresholds configured at step 502. As introduced in relation to FIG. 1, the charging system 108 collects and processes the call measurement data and charging information received from the network nodes 101-105 and, among other things, will derive network traffic and performance information, including charging element loading information. The monitoring element 116 monitors the charging element loading information in relation to the thresholds configured at step 502.

At step 506, the charging system 108 (in particular, the alerting element 118) reports overloads to the vendor 122 in response to the charging element loads meeting or exceeding the thresholds configured at step 502. Additionally, the alerting element may report relevant network traffic and performance information/conditions other than overloads. For example, the alerting element may report actual traffic flows and/or the absence of overloads. In one embodiment, overloads and other information for the equipment vendor are reported in the form of a log file stored locally at the charging element 108 that is accessible to the vendor 122 with a user ID and password known only to the vendor. In such manner, the log file is accessible to the vendor but not to the service provider 114. Alternatively or additionally, the alerting element may report overloads and other information to the vendor remotely via a secure interface.

Optionally, at step 508, the charging system may exercise a shared revenue collection feature whereby the vendor collects revenue from the service provider for specified capacity overloads. This may be implemented, for example, according to a revenue sharing agreement between the service provider and vendor. The shared revenue collection option will be described in greater detail in relation to FIG. 6.

At step 510, the charging system (in particular the vendor capacity control element 120) may exercise a system automatic shut-down for specified capacity overloads. For example, system shut-down of the CDF, CGF or combined CDF/CGF may be triggered when network traffic reaches the 150% capacity (50% overload). As will be appreciated, the charging system may also be implemented to exercise other forms of vendor capacity control, short of system shut-down, to allow the vendor to restrict or control specified overload conditions.

Figure 6:
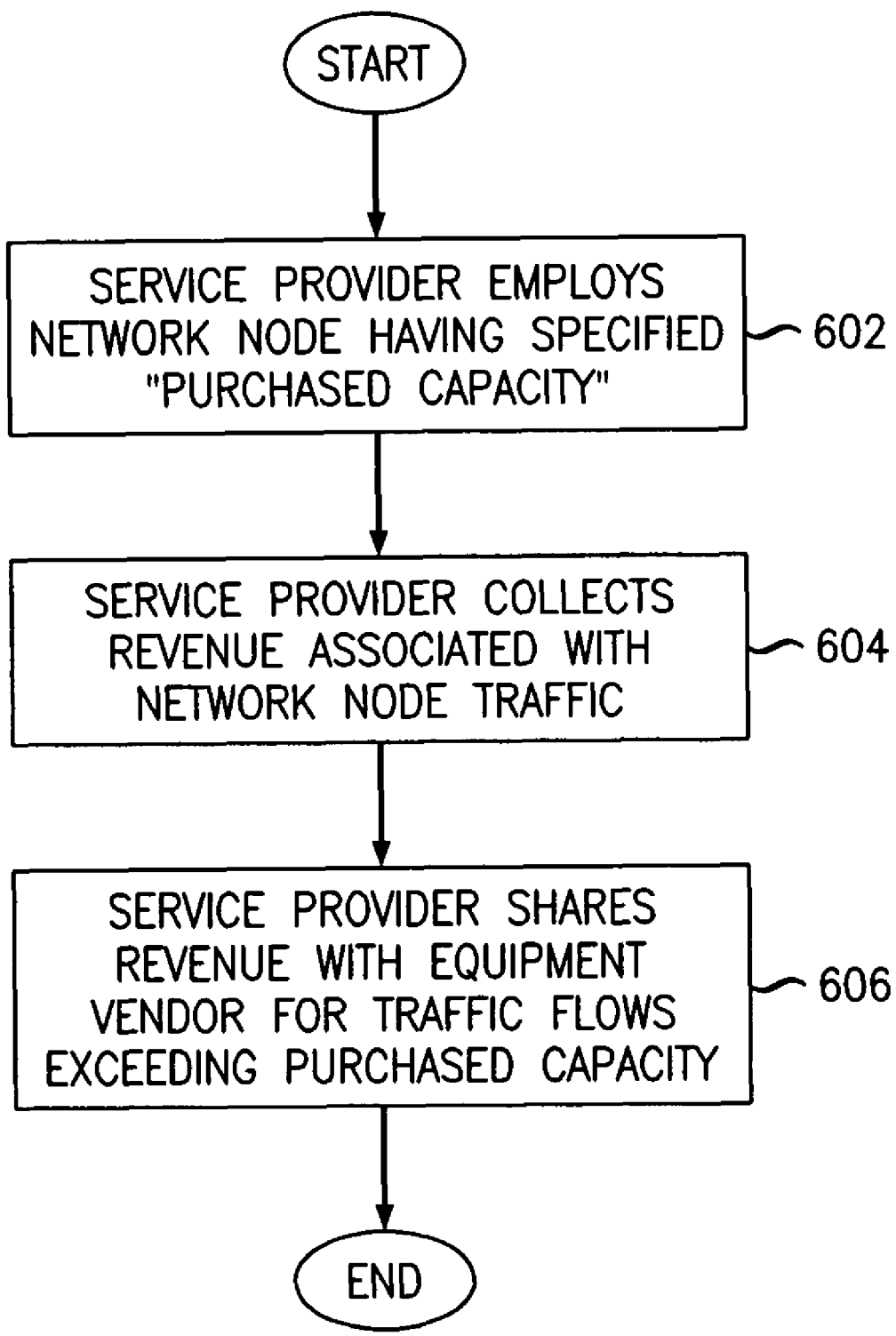
FIG. 6 is a flow chart illustrating a method of revenue sharing between service provider and equipment vendor for operation of IMS charging elements beyond purchased capacity.

Now turning to FIG. 6, there will be described a method of revenue sharing between service provider and equipment vendor for operation of IMS charging elements according to an embodiment of the invention. The steps of FIG. 6 will be described with reference to IMS network 100 in FIG. 1. The steps of the flow chart in FIG. 6 are not all inclusive and may include other steps not shown.

At step 602, the service provider 114 employs a network node (e.g., a CDF, CGF or combined CDF/CGF) having a specified "purchased capacity." For example, as heretofore described, the purchased capacity may comprise a traffic threshold to which individual network nodes of an IMS network are engineered or stated to accommodate; and therefore may be used as a basis for provisioning numbers of network nodes needed to accommodate aggregate traffic flows in the service provider's network. The purchased capacity is typically specified by the equipment vendor/seller. Alternatively, the purchased capacity may be specified by joint agreement with the service provider and vendor.

At step 604, the service provider collects revenue in some manner associated with use of the network nodes to accommodate network traffic. For example, the service provider may attribute a portion of overall revenues associated with IMS traffic to individual network nodes (e.g., a CDF, CGF or combined CDF/CGF) based on network traffic and performance information derived from call measurement and charging information and reported to the network management system 112.

The service provider can also configure alarms to be generated to the network management system 112 when the traffic flows approach or exceed the purchased capacity. As an example, presuming the service provider desires to restrict overloads on the CDF relative to purchased capacity, the vendor may specify the following alarms/actions relative to purchased capacity: 75% capacity—warning; 90% capacity—control action; and 100% capacity—shut down action. As will be appreciated, the service provider may also configure no or low level alarms to the network management system when approaching or exceeding the purchased capacity.

At step 606, the service provider shares revenue with the network node vendor for specified overloads of the network nodes. For example, the service provider may agree in advance to pay the vendor some percentage of revenue responsive to operating a specified network node at or beyond a specified shared revenue collection threshold (e.g., 110% of purchased capacity). As heretofore described in relation to FIG. 5, the vendor is alerted in the form of log file or separate message when the network traffic meets or exceeds certain vendor-specified thresholds which may include a shared revenue collection threshold. In such manner, the vendor can independently know when the threshold is reached and when to implement the shared revenue collection feature. In one embodiment, the vendor will independently meter the amount of traffic/revenue when the shared revenue collection threshold (e.g., 110%) is reached. Alternatively or additionally, metering of the shared revenue can be accomplished by the service provider.

Although specific embodiments were described herein, the scope of the invention is not limited to those specific embodiments. The scope of the invention is defined by the following claims and any equivalents thereof.

I claim:

1. An IMS network comprising:
a plurality of network nodes adapted to generate charging information including call measurement data associated with one or more calls provided by a service provider;
a charging system operated by a charging element equipment vendor and adapted to receive and process the charging information from the network nodes to derive charging element loading information, the charging system including:
a monitoring element adapted to compare the loading information to one or more charging element loading thresholds specified by thresholds predefined by the vendor;
an alerting element adapted to generate alerts/reports to the equipment vendor upon occurrence of specified overloads relative to the vendor thresholds; and
a capacity control element operated by the vendor and adapted, upon receiving the alerts/reports, exercise control of the one or more charging element associated with the specified overloads or collecting revenue relative thereto; and
wherein the service provider employs one or more charging element from the equipment vendor to provide the one or more IMS calls and the equipment vendor does not provide the one or more IMS calls.

2. The IMS network of claim 1 further comprising a network management system, operated by a service provider, and wherein the charging system is further adapted to report at least a portion of the charging element loading information to the network management system, the information reported to the equipment vendor being reported independently from the information reported to the network management system.

3. The IMS network of claim 1 wherein the charging system comprises a 3GPP Charging Data Function (CDF) and a Charging Gateway Function (CGF).

4. The IMS network of claim 3 wherein the CDF and CGF reside in separate physical elements.

5. The IMS network of claim 3 wherein the CDF and CGF are integrated within the same physical element.

6. The IMS network of claim 1 wherein the charging system comprises a 3GPP Charging Data Function (CDF) and a Charging Gateway Function (CGF), and wherein the equipment loading thresholds are defined relative to a purchased capacity of the CDF.

7. The IMS network of claim 1 wherein the charging system comprises a 3GPP Charging Collection Function (CCF), and wherein the equipment loading thresholds are defined relative to a purchased capacity of the CCF.

8. A method of operating an IMS charging system by a charging element equipment vendor comprising:
receiving charging information including call measurement data associated with one or more IMS calls provided by a service provider, wherein the service provider employs one or more charging element from the equipment vendor to provide the one or more IMS calls and the equipment vendor does not provide the one or more IMS calls;
processing the charging information to derive charging element loading information;
defining vendor thresholds;
comparing the loading information to one or more charging element loading thresholds specified by the vendor thresholds;
generating alerts/reports to the equipment vendor upon occurrence of specified overloads relative to the vendor thresholds; and
upon receiving the alerts/reports, the equipment vendor exercising control of the one or more charging element associated with the specified overloads or collecting revenue relative thereto;
wherein the method is carried out by program code stored in a non-transitory computer readable storage media when executed by a computer.

9. The method of claim 8 further comprising:
comparing the loading information to one or more charging element loading thresholds specified by the service provider thresholds; and
generating alerts/reports to the service provider upon occurrence of specified overloads relative to the service provider thresholds.

10. The method of claim 9, wherein the alerts/reports provided to the equipment vendor are reported independently from the alerts/reports provided to the service provider.

11. The method of claim 8, wherein the step of generating alerts/reports to the equipment vendor comprises storing the alerts/reports in a log file accessible to the vendor through a secure interface.

12. The method of claim 8, further comprising taking action specified by the equipment vendor upon occurrence of specified overloads relative to the vendor thresholds.

13. The method of claim 8, wherein the step of taking action includes one or more of:
metering excess traffic;
implementing shared revenue collection;
implementing system shut-down upon reaching a designated one of the specified overloads.

* * * * *